UNITED STATES PATENT OFFICE.

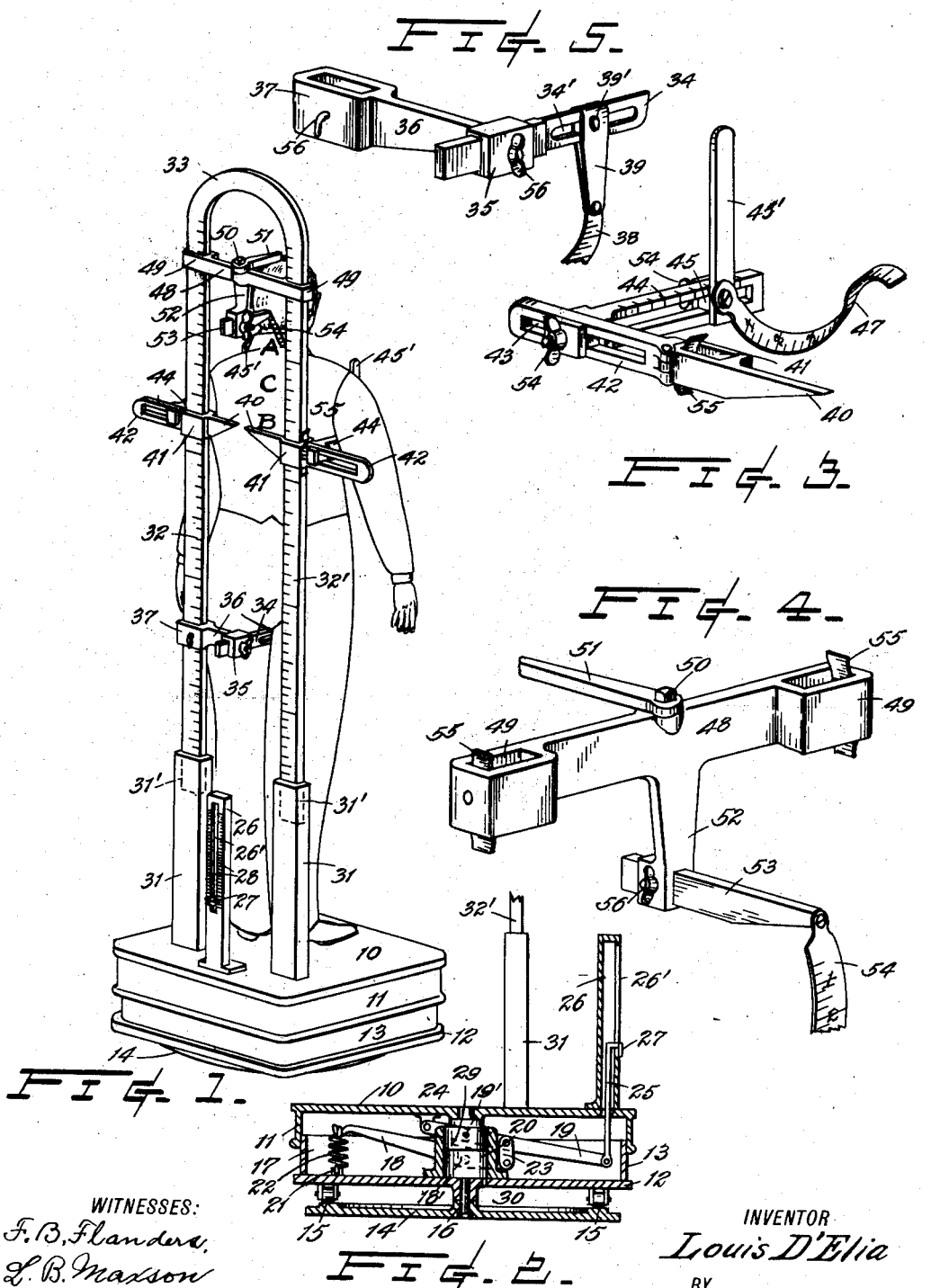

LOUIS D'ELIA, OF SEATTLE, WASHINGTON.

TAILOR'S MEASURING APPARATUS.

No. 826,651.  Specification of Letters Patent.  Patented July 24, 1906.

Application filed January 24, 1906. Serial No. 297,588.

*To all whom it may concern:*

Be it known that I, LOUIS D'ELIA, a citizen of the United States, residing at Seattle, in the county of King and State of Washington, have invented certain new and useful Improvements in Tailors' Measuring Apparatus, of which the following is a specification, reference being had therein to the accompanying drawings, in which—

Figure 1 is a perspective view of a measuring apparatus embodying my invention and showing a man in measuring position on the platform of the same. Fig. 2 is a cross-sectional view of the base portion of the device, and Figs. 3, 4, and 5 are detail perspective views.

This invention relates to apparatus employed in tailoring establishments for measuring a person's form for cutting garments; and its object is the provision of such apparatus wherewith the measurements may be had with greater accuracy and despatch than by any other devices known to me.

With these ends in view the invention consists in the novel construction and combination of parts, as will be hereinafter described, and particularly pointed out in the appended claims.

Referring to the drawings, the numeral 10 designates the platform upon which a person stands when being weighed and measured and is desirably provided with a downwardly-extending marginal flange 11. 12 is a base-plate having a marginal upwardly-extending flange 13, which interfits with that of the said platform. The base-plate is rotatably mounted upon a floor-plate 14 by means of casters 15 and an axial pin 16, whereby the superposed parts, including the person being operated on, may be conveniently turned in any desired direction. Positioned within the chamber 17 between the said base and platform are scale-levers 18 and 19, respectively fulcrumed at 18' and 19' to trunnions provided on the side of the cylinder 20. The lever 18 is connected from one end to lugs 21 of the base-plate by an extensible spring 22 and from its other end by a link 23 with the lever 19. This lever 19 is pivotally connected to the said platform by lugs 24, disposed upon the opposite side of the fulcrum from its connection with the link 23, and the arm to which the latter is connected is extended and connected to a rod 25, extending vertically into a chambered post 26, attached to the platform preferably and having at its rear side a slot 26'. The upper end of the rod is bent and protruded outwardly through the said slot and carries a cross-bar 27, which is moved upwardly against the action of the spring 22 to register with scales 28 upon the face of the post at each side of the aforesaid slot and indicate the weight of the person supported upon the platform. In practice the scale need only be adapted for registering weights in excess of one hundred pounds, and one of the scales upon the post would be designated in pounds and the aliquot parts thereof, while the other scale would be according to the metric systems. Secured to the platform is a pendent plunger 29, which makes a tight sliding fit within the said cylinder, and in the base-plate 12 is an aperture or leak-hole 30, through which the admission and discharge of the air from the interior of the cylinder are retarded for the purpose of preventing the platform being violently forced up or down as a person steps from or upon the same. Adjacent of the rear and side edges of the said platform are posts 31, having in their upper extremities sockets 31' for the reception of the lower ends of the legs 32 32' of the standard 33, which is desirably of an inverted-U shape, as shown in Fig. 1, and forms the framework upon which the following described measuring devices are adjustably supported. The legs of the standard are inscribed with graduations of lineal measurements taken from the upper surface of the platform. For example, the mark representing forty inches would indicate that it is situated at a corresponding elevation from the said platform, and so on. The measuring device for ascertaining the height of the parting of the legs of a person consists of a horizontal bar 34, which is slidable in a sleeve 35 of a transverse arm 36, provided with another sleeve 37, which is slidable vertically upon the frame-leg 32. The upper edge of the bar 34 is disposed in the same horizontal plane with the top edge of the sleeve 37, and consequently the measurement registered upon the scale of said leg will denote the height of a person's crotch from the platform when the bar is raised to press snugly thereagainst. While a measurement taken in this way is accurate, an alternate or supplemental means is provided to accomplish the same end to have the process conform more closely to processes now in vogue. Such alternate means consists of a tape-measure 38, (see Fig. 5,) which is slidably connected with the said bar, as by a pair of pendent clips 39, having a securing-pin 39' passing through a longitudinal slot 34' of the bar, and the scale-markings of the tape are laid off from the upper edge of the bar. Consequently the measurements for the inseam of a pair of trousers would in this instance be taken downwardly. Inwardly-directed tapering fingers 40 are slidably and independently connected to the said frame-legs by sleeves 41, and hinged to the latter are arms 42, directed oppositely from the respective said fingers and are each provided with a slot 43, in which are slidably mounted the rectangularly and forwardly directed arms 44, which in turn are slotted for the reception of an offset portion 45 of upright arms 45'. Said forwardly-directed arms are for the purpose of getting the relative elevations of the armpits of the person being measured, and the difference, if any, will be apparent from the apices of the fingers being out or in line, as the case may be, an important consideration to know when designing a coat. The upright arms 45' are for getting the thickness of the respective shoulders and which will be indicated from the scale-markings provided upon the arms 44 when the former are moved against the person being measured when standing in the position represented in Fig. 1. Pivotally attached to each of the arms 45' is a tape-measure 47 for taking the girth of the shoulder and various other measurements, which can be had from this point and understood in the art.

48 is a cross-bar having sleeves 49 in proximity of its ends, which are slidable vertically upon the frame-legs. Pivotally connected to this bar by a bolt 50 is a limb 51, adapted to swing horizontally and having its under edge in the same plane with the upper edge of the bar-sleeves 49 in order that when the limb rests upon the head of the person being measured his extreme height will be precisely determined by the registration of either of the sleeves 49 with the scale-markings upon the frame. Projecting forwardly from a dependent piece 52 of the bar 48 and slidable therein is a bar 53, to the front end of which is a tape-measure 54.

The aforesaid movable parts are provided with means—such as screws 56, butterfly-nuts 54, or springs 55—for adjustably maintaining them in various set positions.

In operating the invention the person to be measured stands upon the platform 10 and his weight and height taken, as before described, and which data are essential to the proper proportioning and fitting of the garments and, in fact, through the knowledge of which many of the dimensions may be taken therefrom instead of directly from the subject. For example, a man weighing one hundred and forty pounds and of a height of five feet eight inches would ordinarily have a breast measurement of thirty-six inches, with an increase or reduction of one inch, respectively, for an additional or decrease of ten pounds, and with a variation in height a corresponding variation in the measurements would likewise rule. The next step would be to ascertain the height of the person's arms to find out whether they correspond. This is accomplished, as already explained, by the arms 42, and having set the upright arms 45' against the front of the shoulder-blades the girth of the arms thereat and the length of the arm may be found with the tape 47. The bar 48 is then moved downwardly to present the front end of the bar 53 against the collar-bone at A, from whence, with the tape-measure 54, the "dip of the scye" B and the lengths of the waist and coat are taken. The bar 48 is then shifted to bring the bar 53 to C, intermediate A and B, and wherefrom the width of the back and the distance from the middle of the latter and the outer ends of the sleeves are made. Now move the bar being employed to the point B, from where the "blade" and other measurements are taken with the tape-measure in question. After taking the measurements already specified the girth of the waist and hip can be successively found by manipulating the appliances just referred to. The girths at the thigh, knee, &c., can be determined with the first-mentioned tape-measure at various elevations. The arms 44 may now be lowered to bear against the hips of the person being measured, and if it is found that the fingers 40 then lie in the same horizontal plane the hips will be of equal height, and with the tape-measure 47 of either side may be utilized for measuring downwardly upon the corresponding leg to get the depths on the outside seam of the pants for its entire length and also to the knee, and which measurements will answer for the opposite leg of the trousers. Should the heights, however, of the said fingers not correspond, then the measurements for each pant's leg will obviously have to be taken separately.

With this invention all of the measurements required by a tailor can be accurately taken and in a most convenient and expeditious manner.

Having described my invention, what I claim as new, and desire to secure by Letters Patent, is—

1. In combination with a standard consisting of a pair of legs, a sleeve mounted on each leg, an inwardly-extending finger connected to each sleeve, said fingers having their free ends located adjacent to one another, arms hinged to the sleeves, upright arms adjustably secured to said arms, and tape-measures secured to the upright arms.

2. In combination with a standard consisting of a pair of legs, a sleeve movable on each leg, each of said sleeves having inwardly-extending parts located adjacent one another, arms adjustably carried by said sleeves, and members adjustably carried by the arms and having tape-measures secured thereto and movable therewith.

3. In combination with a standard consisting of a pair of legs, a cross-bar having sleeves receiving said legs, a limb pivoted on the cross-bar at the upper part thereof, a member dependent from said cross-bar, and a bar connected to said member and carrying a tape-measure.

4. In combination with a standard consisting of a pair of legs, a cross-bar having sleeved ends receiving said legs, a horizontal limb pivoted on the top of the cross-bar central thereof, a member dependent from said cross-bar, a bar extending through the lower portion of said member and adjustably secured thereto, and a tape-measue secured at the front end of said bar.

In testimony whereof I affix my signature in presence of two witnesses.

LOUIS D'ELIA.

Witnesses:
PIERRE BARNES,
F. B. FLANDERS.